United States Patent

Kawai et al.

[11] Patent Number: 5,602,861
[45] Date of Patent: Feb. 11, 1997

[54] LASER LIGHTING CONTROL DEVICE

[75] Inventors: Hiroaki Kawai; Shinichi Sato, both of Kawasaki, Japan

[73] Assignee: Fujitsu Limited, Kawasaki, Japan

[21] Appl. No.: 209,743

[22] Filed: Feb. 16, 1994

[30] Foreign Application Priority Data

Apr. 2, 1993 [JP] Japan .................... 5-076937

[51] Int. Cl.$^6$ .............. H01S 3/00; G06K 7/10; H01J 40/14
[52] U.S. Cl. .................. 372/38; 372/33; 372/24; 250/205; 250/222.1; 235/455
[58] Field of Search ................. 372/38, 32, 30, 372/31, 337, 24; 250/205, 222, 221, 208.4; 235/462, 455

[56] References Cited

U.S. PATENT DOCUMENTS 5,299,212 3/1994 Koch et al. .................. 372/32

FOREIGN PATENT DOCUMENTS 61141465 6/1986 Japan .................... 372/43
6-215399 8/1994 Japan .................... 372/38

OTHER PUBLICATIONS

M. A. Karr et al. "Output Power Stability of GaAlAs laser transmitters using optical tap for feedback control", 15 Apr. 1979, Applied Optics 18(8).

Primary Examiner—Rodney B. Bovernick
Assistant Examiner—Robert McNutt
Attorney, Agent, or Firm—Staas & Halsey

[57] ABSTRACT

A device suitable for a laser-type bar code reader used in a POS (point of sales) system in the distribution industry, and more particularly, to a laser lighting control device in a laser scanner device which reads a bar code using a reflection light of a laser beam. A prolonged operational life and an improved reliability of the laser light source build-in device under intermittent light on/off control is achieved by monitoring its lighting time to execute the operational life control thereof. The laser lighting control device includes a laser light source, a drive unit for performing a light on/off drive of the laser light source to control the light on/off thereof, a control unit for outputting a light on/off command to the drive unit for laser light source control, and a timer unit for measuring the total lighting time of the laser light source.

32 Claims, 5 Drawing Sheets

LASER LIGHTING CONTROL DEVICE

BACKGROUND OF THE INVENTION

1. Field of the Invention

The present invention relates to a device suitable for a laser-type bar code reader which is used in a POS (point of sales) system in the distribution industry, and more particularly, to a laser lighting control device in a laser scanning device which reads a bar code or the like using a reflected laser beam.

2. Description of the Related Art

FIG. 5 is a block diagram showing the configuration of a bar code reading device (bar code reader). Referring now to FIG. 5, numeral 1 represents a bar code printed on the surface of an article, the bar code being formed of plural black bars and white bars arranged alternatively. A predetermined datum is represented based on the width of each black bar and the width of each white bar.

An optical system (laser scanning device) 2 irradiates a laser beam L2 to the bar code 1 and receives a reflected light R1, or the laser beam L2 reflected by the bar code 1. The optical system 2 also comprises a laser emitting unit 3, a scanning mechanism 4 and an optical converter unit 5. The laser emitting unit 3 includes a semiconductor laser device for emitting the laser beam L1. The scanning mechanism 4 comprises a polygon mirror that is rotatably driven with, for example, a motor. The scanning mechanism 4 also irradiates the laser beam L2 to the plural black bars and white bars forming the bar code 1, the beam L2 formed by reflecting the laser beam L1 from the laser emitting unit 3, while it moves and scans it at a fixed rate in the direction perpendicular to the black and white bars of the bar code 1.

The scanning mechanism 4 irradiates the reflected beam R1 as the reflected beam R2 to the photoelectric converter unit 5, the reflected beam R1 being the laser beam L2 reflected by the bar code 1 and traveled with the laser beam L2 scanned.

The photoelectric converter unit 5 is formed of a photoelectric converting element, for example, a photo diode. The photoelectric converter unit 5 receives the reflected light R2 (light input signal) via the scanning mechanism 4 to convert it to an electric signal (analog value) corresponding to the light amount thereof.

In FIG. 5, the A/D converter unit 6 digitizes the electric signal from the photoelectric converter unit 5 to convert it to a binary signal including a black level signal corresponding to each black portion and a white level signal corresponding to each white portion in the bar code 1. The white level signal represents a high level signal and the black level signal represents a low level signal because the light amount of the light R2 reflected by each white bar is larger than that of the light R2 reflected by each black bar in the binary signal.

The bar width counter 7 counts the clock signal from the clock generator 8. The bar width counter 7 also outputs as a clock signal count value the time widths of the black level signal portion and the white level signal portion of a binary signal from the A/D converter unit 6, or each black bar width and each white bar width of an actual bar code 1.

Furthermore, the memory 9 stores the bar width count value from the bar width counter 7. The CPU 10 extracts and demodulates predetermined data of the bar code 1 based on the bar width count value (a value corresponding to each black bar width or each white bar width) stored in the memory 9.

In the above structure, the scanning mechanism 4 irradiates the laser beam L1 emitted from the laser emitting unit 3 as the laser beam L2 to the black bars and the white bars of the bar code 1 while it moves and scans it at a constant rate in the direction perpendicular to the black bars and white bars of the bar code 1.

The laser beam L2 emitted from the scanning mechanism 4 is scatteringly reflected on a portion of the bar code 1 and is re-irradiated as the reflected light R1 to the scanning mechanism 4. The reflected light R1 varies its reflection angle as the laser beam L2 scans and moves. However, the polygon mirror comprising the scanning mechanism 4 reflects the reflected light R1 as the reflected light R2 to the photoelectric element in the photoelectric converter unit 5 arranged at a predetermined place.

The photoelectric converter unit 5 converts the reflected light R2 to an electric signal corresponding to the amount thereof. The A/D converter unit 6 digitalizes the electric signal into a binary signal including a black level signal corresponding to each black portion of the bar code 1 and a white level signal corresponding to each white portion of the bar code 1.

Then, the bar width counter 7 counts the clock signal from the clock generator 8 to measure as a clock signal count value the time width (values corresponding to the widths of each black portion and each white portion in an actual bar code 1) of the black level signal portion and a white level signal portion of a binary signal from the A/D converter unit 6. The memory 9 temporarily stores the count value. The CPU 10 subjects the bar width count value stored in the memory 9 to a predetermined demodulation process to extract and demodulate the determined data of the bar code 1.

Generally, the laser scanning device (optical system) 2 includes a laser diode (semiconductor laser) as the light source of the laser emitting unit 3 to realize a miniaturized device and a power source with small power consumption.

In order to prolong the operational life of the laser diode, a Gun-type laser scanner device with a trigger switch and a laser scanner device with an item sensor are used.

The Gun-type laser scanning device emits the laser beam by performing a lighting control of the laser light source only when a trigger switch is turned on. The laser scanning device with an item sensor subjects the laser light source to a lighting control only when the item sensor detects the fact that the object with a bar code to be read is close to the device, whereby a laser beam is emitted.

The laser scanning device subjects the laser light source to a lighting drive only when reading a bar code or the like is needed so that the serviceable life of the laser light source such as a laser diode is prolonged.

As described above, in order to prolong the operational life of the laser scanning device, the device with a laser light source has been desired to prolong further the operational life of the laser light source. In order to solve the problem, it is needed to execute a certain life control of the laser light source.

In order to judge whether there is a variation in quality of the laser light source or the laser light source has been fully used up to its substantial use limit (life), the laser light source must be taken out inspection with special means. Therefore, if the laser light source has run down so that its malfunction in lighting causes the use of it impossible, is difficult to easily judge the life termination factor.

In order to perform the life control of a laser light source with high reliability, it is desirable to control the lighting period of time of the laser light source. However, the laser light source, which is subjected to an intermittent lighting on/off control by controlling its lighting condition under a program control in various modes or by lighting only at its use time, has not been subjected to a lighting time control. In order to determine the lighting time of the laser light source, it is considered that the laser light source is continuously used from the use starting time. However, this method causes a shortened operational life of the laser light source and a periodical exchange of the laser light source, thus boosting the manufacturing cost.

SUMMARY OF THE INVENTION

The present invention is made to overcome the above mentioned problems. An object of the present invention is to provide a laser lighting control device that can certainly recognize the lighting time of a laser light source subjected to an intermittent on/off lighting control, whereby a laser light source built-in device can provide a prolonged operational life and improved reliability.

In order to achieve the above objects, according to the present invention, the laser lighting control device comprises a laser light source; drive means for driving the laser light source to light on or off; control means for outputting a laser light source on/off command to the driver means; and time measuring means for measuring a period of lighting time of the laser light source.

The time measuring means measures a period of lighting time of the laser light source by measuring a period between a lighting on command output and a lighting off command output which are sent from the control means to the drive means. The laser lighting control device may further include storage means for storing the period of lighting time of the laser light source measured by the time measuring means.

Furthermore, the laser lighting control device may further include notifying means for notifying an external computer of a period of lighting time of the laser light source which is measured by the time measuring means. In this case, the notifying means notifies the external computer of a period of lighting time of the laser light source measured by the time measuring means in response to a notification command from the external computer.

The laser lighting control device may further include clear means for automatically clearing a time value measured by the time measuring means after the notifying means has notified the external computer of a period of lighting time of the laser light source. Instead of the clear means automatically clearing the time value, the clear means may clear the time value measured by the time measuring means in response to a clear command from the external computer.

Therefore, since the laser lighting control device of the present invention includes time measuring means which measures the lighting period of time of the laser light source, the operational life control can be performed by determining the lighting time even if the laser light source is subjected to an intermittent lighting on/off control. Therefore there are advantages in that the laser light source built-in device has a prolonged operational time and can provide a highly improved reliability.

DESCRIPTION OF THE PREFERRED EMBODIMENTS

Referring to the attached drawings, an explanation will be made in detail as to the preferred embodiments of the laser emitting control device according to the present invention.

(a) The Aspect of the Invention

Figure 1:
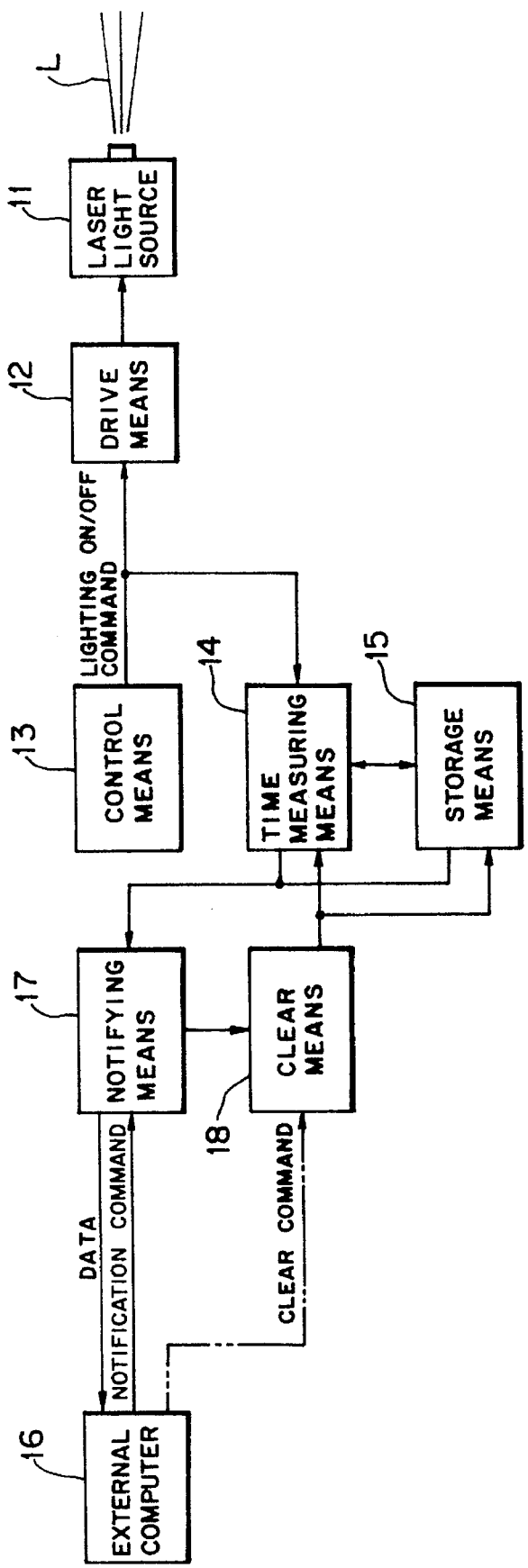
FIG. 1 is a block diagram showing an aspect of the present invention.

FIG. 1 is a block diagram showing an aspect of the present invention. Referring to FIG. 1, the laser emitting control device includes a laser light source 11, drive means 12 for executing the on/off drive of the laser light source 11, control means 13 for producing an on/off command for the laser light source 11 to the drive means 12, time measuring means 14 for measuring the period of lighting time of the laser light source which is the time between the lighting on command output and the lighting off command output sent from the control means 13 to the drive means 12, and storage means 15 for storing the period of lighting time of the laser light source 11 measured by the time measuring means 14.

The notifying means 17 notifies the external computer 16 of the period of lighting time of the laser light source 11 measured by the time measuring means 14. When receiving a notifying command from the external computer 16, the notifying means 17 notifies the external computer 16 of the period of lighting time of the laser light source 11 measured by the time measuring means 14.

The clear means 18 clears the count value measured by the time measuring means 14. The clear means 18 may automatically clear the measured value from the time measuring means 14 after the notifying means 17 notifies the external computer 16 of the lighting time of the laser light source 11 or the clear means 18 may clear the count value from the time measuring means 14 in response to a clear command from the external computer 16.

In the laser emitting control means according to the present invention, the drive means 12 receives the on/off command of the laser light source 11 from the control means 13 to on/off control the laser light source 11. The time measuring means 14 measures the time between the light-on command output and the light-off command output from the control means 13 to the drive means 12, or a period of lighting time of the laser light source 11. The count value (the period of lighting time of the laser light source 11) from the time measuring means 14 is stored in the storage means 15.

When receiving a notification command from the external computer 16, the notifying means 17 notifies the external computer 16 of the count value from the time measuring means 14 or the storage means 15.

The count value from the time measuring means 14 is cleared (zeroed), if necessary, by the clear means 18. The clearing operation of the time measuring means by the clear means 18 may be automatically performed immediately after the notifying means 17 has notified the external computer 16 of the period of lighting time of the laser light source 11, or only when a clear command from the external computer 16 has been received.

As described above, the laser lighting control device is constituted in such a manner that the time measuring means 14 measures the period of lighting time of the laser light source 11. Hence, even when the laser light source 11 is subjected to an intermittent on/off lighting control, the lighting time can be certainly recognized to perform the operational life control of the laser light source 11. Thus, there is an advantage in that the device with a laser light source 11 can provide a prolonged operational life and a highly improved reliability.

(b) An Embodiment of the Present Invention

An explanation will be made as for the embodiment of the present invention with reference to attached drawings.

Figure 2:
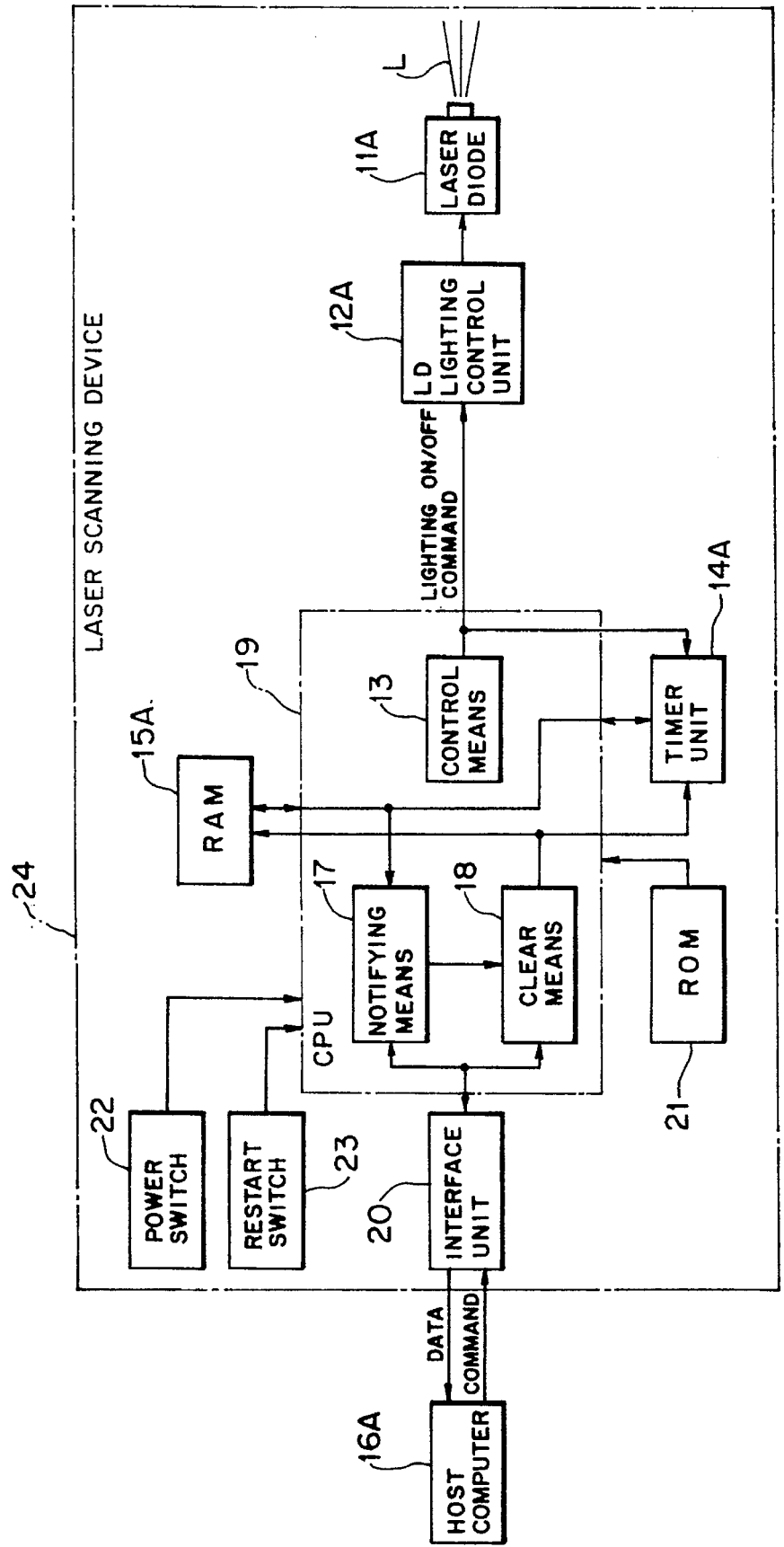
FIG. 2 is a block diagram showing an embodiment of the present invention.

FIG. 2 is a block diagram showing a first embodiment of the present invention. Referring to FIG. 2, the numeral 11A represents a laser diode (laser light source) LD for emitting a laser beam L, and 12A represents an LD lighting unit (drive means) for performing a light on/off drive control of the laser diode 11A.

As shown in FIG. 2, the control means (shown later) 13, the notifying means 17 and the clear means 18 are constituted as software in the CPU 19. The control means 13 outputs the light on/off command of the laser diode 11A to the LD lighting control unit 12A.

The timer unit (time measuring means) 14A is attached to the CPU 19. The timer unit 14A measures as a clock count value the time difference between the light-on command output and the light-off command output delivered from the control unit 13 to the LD lighting control means 12A (or the period of lighting time of the laser diode 11A).

The RAM (storage means) 15A stores the period of lighting time of the laser light source 11 measured by the timer unit 14A. The RAM 15A stores and holds temporarily the time (count value) measured by the timer unit 14A while the laser scanning device 24 is turned (or powered) off. The CPU 19 transmits the data (count value) of the timer unit 14A to the RAM 15A for storage immediately prior to the laser scanning device being turned off. When the laser scanning device 24 is re-powered on, the CPU 19 reads out the data (count value) stored in the RAM 15A to re-set the timer unit 14A.

The host computer (external computer) 16A as a higher-rank computer, is externally arranged in relation to the laser scanning device 24 of the present embodiment to systematically monitor the same. The notifying means 17 reads the period of lighting time (count value) of the laser diode 11A measured by the timer unit 14A out of the timer unit 14A or the RAM 15A and then transmits it to notify the host computer 16A. The notifying means 17 transmits to the host computer 16A the lighting time of the laser diode 11A after receiving the time the count value notifying command (notifying command) from the host computer 16A.

The clear means 18 clears the count value (measured value) measured by the timer unit 14A. The clear means 18 is formed so as to clear automatically the count value (measured value) measured by the timer unit 14A after the notifying means 17 has transmitted and notified the period of lighting time of the laser diode 11A to the host computer 16A (refer to the operation explained of FIG. 3). The clear means 18 may be formed so as to clear the count value (measured value) of the timer unit 14A in response to the count value clearing command (clear command) from the host computer 16A (refer to the operation explained with FIG. 4).

The interface unit 20 inputs and outputs commands and data interchanged between the CPU 19 of the laser scanning device 24 and the external host computer 16A. The ROM 21 stores programs to control the lighting state of the laser diode 11A. Numeral 22 represents a power switch for the laser scanning device 24 and 23 represents a restart switch (the operation of which will be described later).

The laser scanning device 24 of the present embodiment is formed of the laser diode 11A, the LD lighting control unit 12A, the CPU 19, the timer unit 14A, the RAM 15A, the ROM 21, the interface unit 20, the power switch 22, and the restart switch 23.

After the power switch 22 is turned on to activate the laser scanning device 24, the control means 13 in the CPU 19 controls the laser scanning device 24 in various modes based on the program in the ROM 21.

For example, in response to the lighting on/off command from the control means 13, the laser diodes 11A are fully lighted on when an object to be read such as a bar code is within the visual field of the laser scanning device 24. If an object to be read such as a bar code is not within the visual field of the laser scanning device 24 for a long period of time, the lighting intervals of the laser diodes 11A are gradually widened and intermittently lighted on. Thus after a lapse of a predetermined period (for example, 30 minutes), the system driving motor (not shown) is automatically stopped while the laser diodes 11A are automatically turned off.

In order to re-start the reading operation of the laser scanning device 24 in the above state, the re-start switch 23 is operated to output the lighting command from the control means 13, whereby the laser diodes 11A are lighted on. Next, the lighting control is performed in accordance with the above described manner.

The laser scanning device 24 according to the present embodiment performs lighting controls in various modes in addition to the above control modes. The control program for each mode is stored, if necessary, in the ROM 21 and is read out of the ROM 21 to the control means 13 in the CPU 19.

According to the laser scanning device 24 of the present embodiment, the control means 13 in the CPU 19 produces the lighting on/off command for the laser diode 11A to the LD lighting control unit 12A in accordance with the each control mode based on the program control. The LD lighting control unit 12A controls the lighting on/off state of the laser diode 11A.

In this time, the timer unit 14A measures as a clock count value the time taken from the light-on command output to the light-off command output sent from the control means 13 to the LD lighting control unit 12A 13 or the lighting time of the laser light source 11. The count value measured by the timer unit 14A is stored in the RAM 15A when the laser scanning device 24 is powered off. The CPU 19 reads the count value out of RAM 15A to re-set the timer unit 14A when the laser scanning device 24 is re-powered on.

Figure 3:
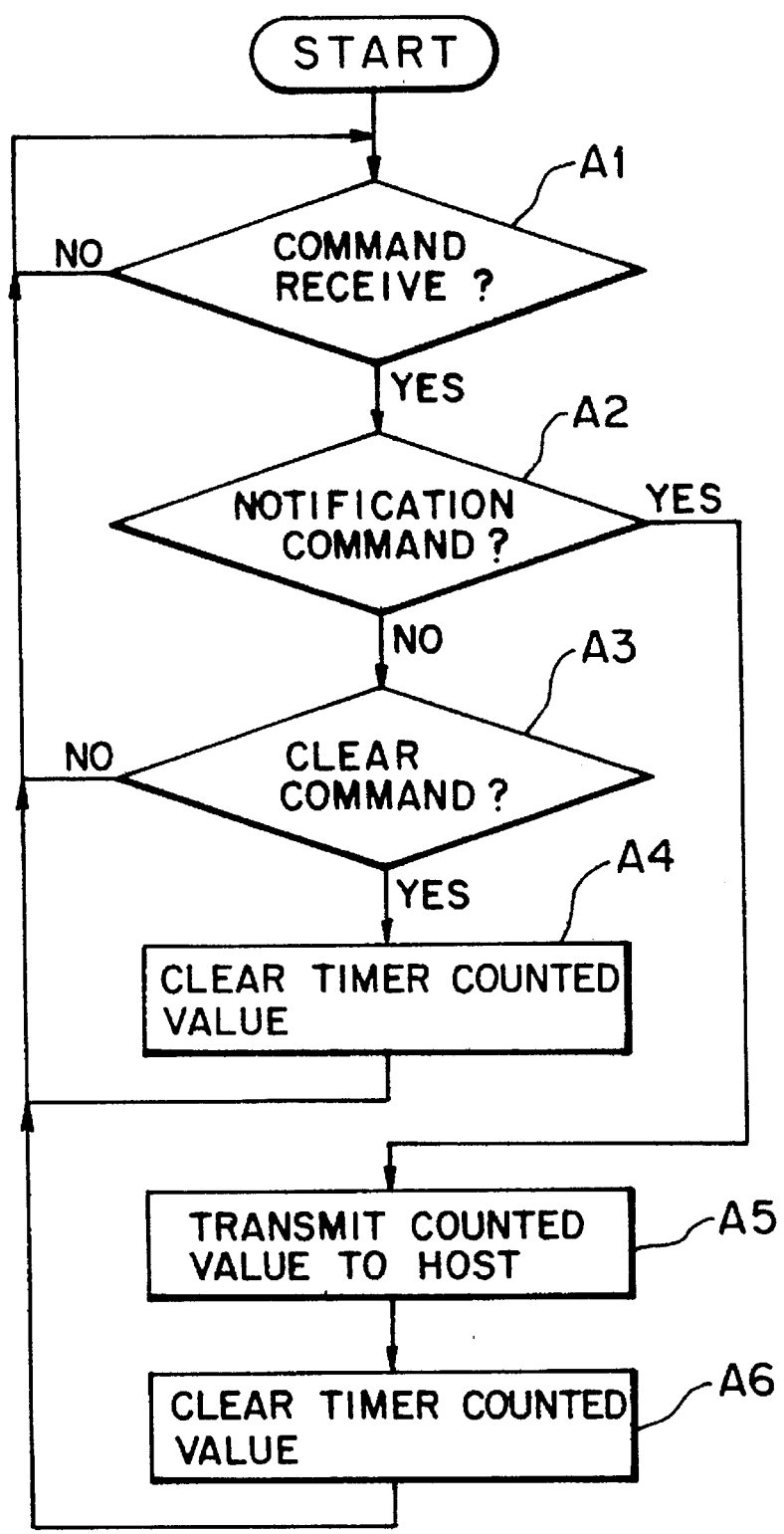
FIG. 3 is a flow chart used for explaining a command receive processing operation of the embodiment according to the present invention.

In the present embodiment, the CPU 19 in the laser scanning device 24 executes the command receiving process according to the procedure shown in FIG. 3. In other words, as shown in FIG. 3, it is judged whether a command from the host computer 16A has been received (step A1). When a command has been received, it is judged whether the command is a count value notifying command (step A2).

If it is judged that the command is not the count value notifying command, it is judged whether it is a count value clear command (step A3). If it is judged that the command is the count value clear command, the clear means 18 clears the count value (such as the count value set in the timer unit 14A and the count value stored and memorized in the RAM 15A) measured by the timer unit 14A (step A4). When the command has not been received or the command is not either a count value command or a count value clear command, even if it has been received, the judgment returns to the step A1.

In the step A2, when it is judged that the received command is a count value notifying command, the notifying means 17 reads the count value (measured value) out of the timer unit 14A or the RAM 15A to transmit and notify the host computer 16A (step A5). In the present embodiment, after the notifying means 17 transmits the count value to the host computer 16A, the count value from the timer unit 14 (such as the count value set in the timer unit 14A and the count value memorized and stored in the RAM 15A) are automatically cleared by the clear means 18 (step A6).

Figure 4:
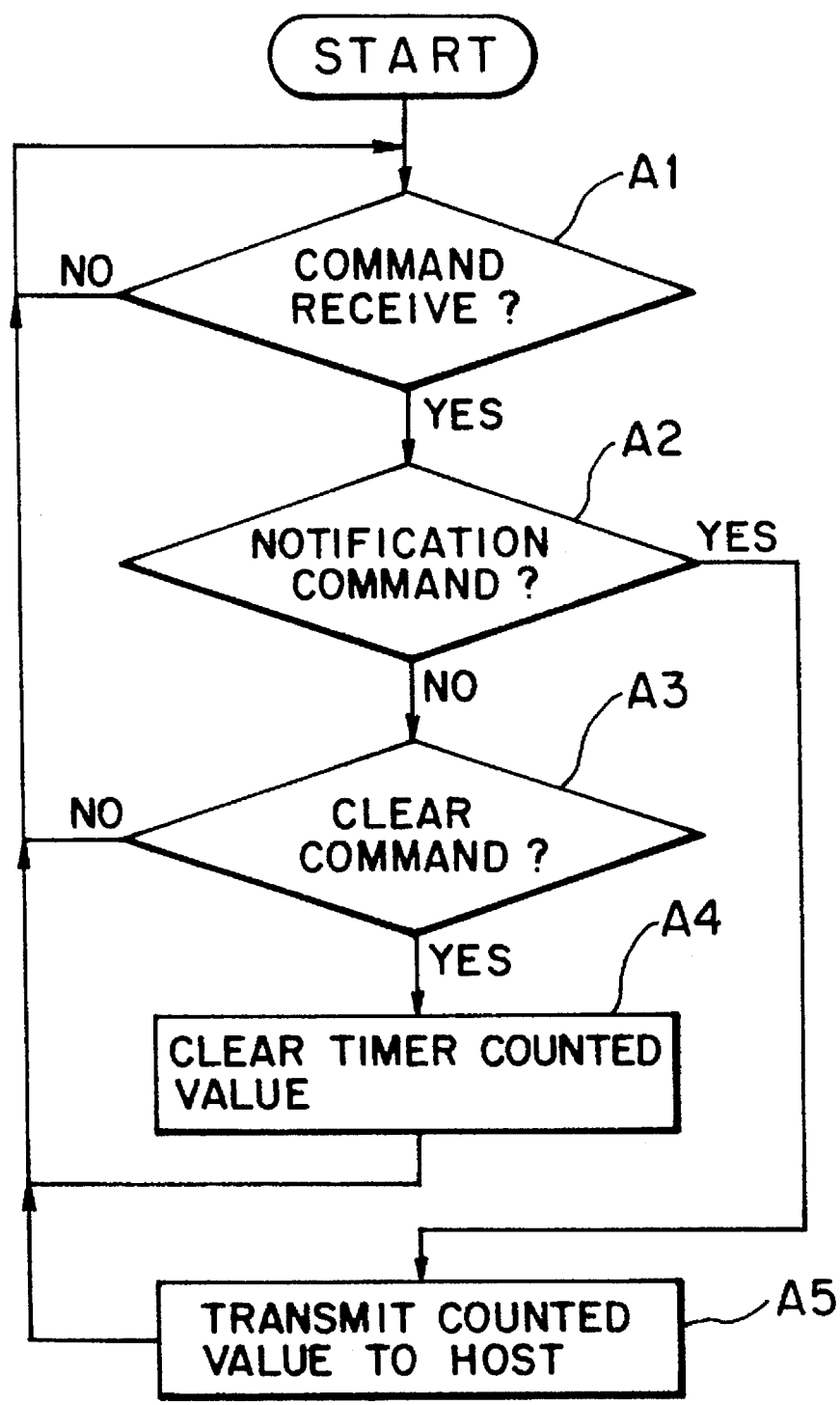
FIG. 4 is a flow chart used for explaining a command receive processing operation of a modified embodiment according to the present invention.
Figure 5:
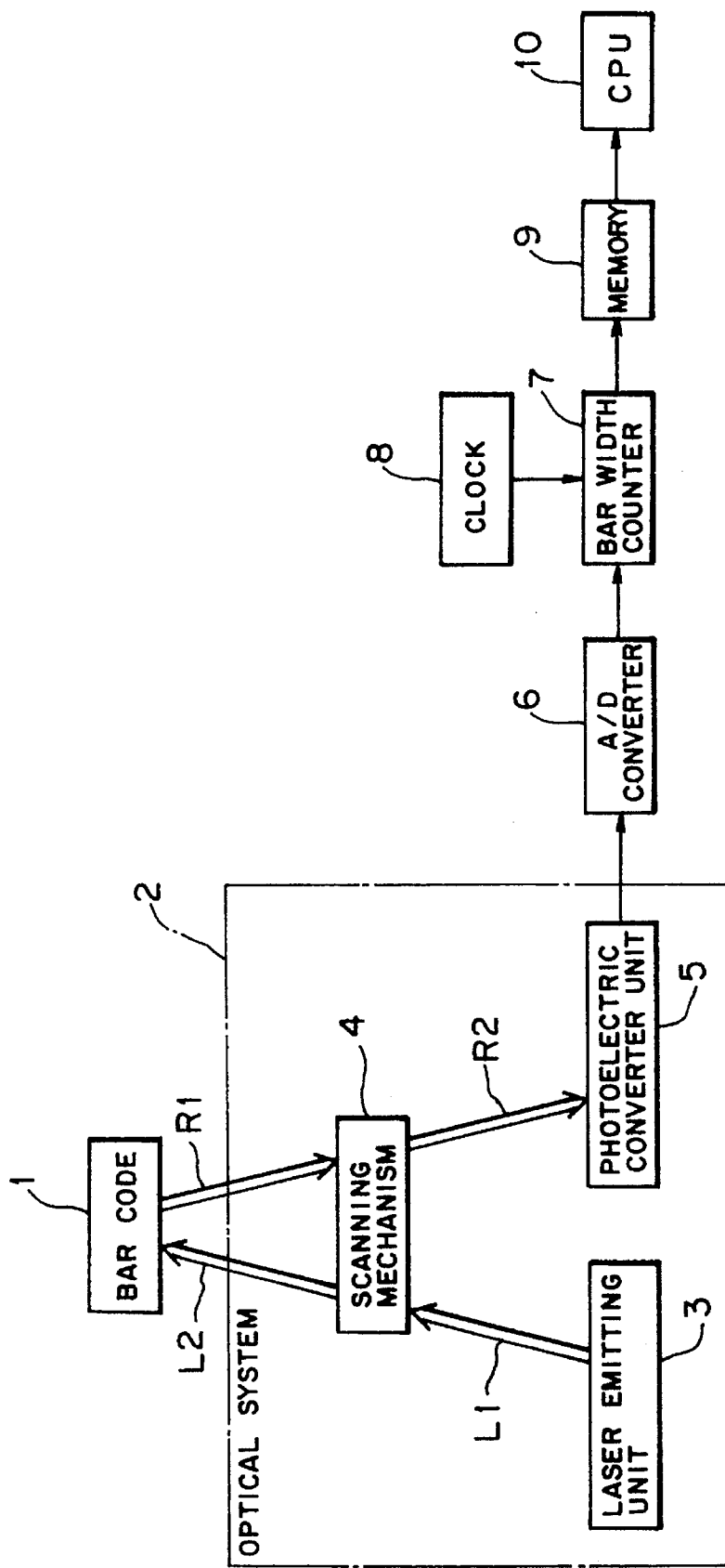
FIG. 5 is a structural block diagram showing a bar code reader.

It has been described that after the notifying means 17 notifies the host computer 16A of the count value measured by the timer unit 14A, the clear means 18 clears automatically the count value. As shown in FIG. 4, the clear means 18 may clear the value counted by the timer unit 14A only when the clear means 18 receives the clear value command from the host computer 16A without clearing automatically the count value after a count value notification. The process flow shown in FIG. 4 is obtained by removing the step A6 from the process flow shown in FIG. 3.

Moreover, before the count value by the timer unit 14A is cleared, it may be integrated and then stored into the RAM 15A or a counter (not shown) to memorize the total lighting time of the laser diode 11A. The total lighting time is not cleared as long as the laser diode 11A is not exchanged.

According to the device of the present embodiment, the timer unit 14A can determine the lighting time of the laser diode 11A as a clock count value even when the laser diode 11A executes an intermittent lighting on/off control in various modes under the program control.

Therefore the count value can be used to judge the cause of the operational termination of the laser diode 11A. The host computer 16A can execute the serviceable life control of the laser diode 11A. The laser scanning device 24 including the laser diode 11A has a prolonged operational life and highly improved reliability.

In the above embodiment, an explanation has been made as for the case where the device according to the present invention is applied to the bar code reading laser scanner device 24. However, it should not be restricted only to the above embodiments according to the present invention. The present invention can be applied to any device using a laser light source (laser diode), thus providing functions and effects similar to those of the above embodiments.

In the above embodiment, an explanation has been made as for the notifying means 17 notify the host computer 16A of the count value measured by the timer unit 14A only when a count value notifying command from the external host computer 16A is received. However, the present invention should not be restricted only to the above embodiments. For example, the notifying means 17 in the CPU 19 may operate periodically to forward and notify the count value measured by the timer 14A to the host computer 16A.

What is claimed is:

1. A laser lighting control device, comprising:

a laser light source;

drive means for driving said laser light source to alternately light on and off, thereby producing periods of lighting time of said laser light source;

control means for outputting laser light source on/off commands to said drive means such that said laser light source is controlled in a full lighting state in response to an object to be read coming into a field of vision of the laser scanner, said laser light source being intermittently controlled by gradually widening the lighting interval of said laser light source in response to a time that no object to be read within the field of vision of the laser scanner exceeds a first predetermined period of time, and said laser light source is automatically turned off when the time that no object to be read comes within the field of vision exceeds a second predetermined time longer than the first predetermined time; and time measuring means for measuring and storing the periods of lighting time of said laser light source and integrating each of the periods of lighting time, to generate an integrated lighting time of the laser light source.

2. The laser lighting control device according to claim 1, wherein said time measuring means measures each period of lighting time of said laser light source by measuring a period between the laser light source on command and the laser light source off command sent from said control means to said drive means.

3. The laser lighting control device according to claim 2, further comprising:

a power source to power the laser lighting control device during a power on state and cutting off the laser lighting control device during a cut off state; and storage means for storing, as a stored value, the integrated lighting time of said laser light source measured by said time measuring means immediately prior to the cut-off state and transmitting the stored value back to said time measuring means as the integrated lighting value when the power on state is initiated.

4. The laser lighting control device according to claim 3, further comprising notifying means for notifying an external computer of the integrated lighting time of said laser light source measured by said time measuring means.

5. The laser lighting control device according to claim 4, wherein said notifying means notifies the external computer of the integrated lighting time of said laser light source measured by said time measuring means in response to a notification command from the external computer.

6. The laser lighting control device according to claim 5, further comprising clear means for automatically clearing the integrated lighting time from said time measuring means after said notifying means has notified the external computer of the integrated lighting time of said laser light source.

7. The laser lighting control device according to claim 5, further comprising clear means for automatically clearing the integrated lighting time from said time measuring means in response to a clear command from the external computer.

8. The laser lighting control device according to claim 4, further comprising clear means for automatically clearing the integrated lighting time from said time measuring means after said notifying means has notified the external computer of the integrated lighting time of said laser light source.

9. The laser lighting control device according to claim 4, further comprising clear means for automatically clearing the integrated lighting time from said time measuring means in response to a clear command from the external computer.

10. The laser lighting control device according to claim 4, further comprising clear means for automatically clearing both the integrated lighting time from said time measuring means and the stored value from said storage means after said notifying means has notified the external computer of the integrated lighting time of said laser light source.

11. The laser lighting control device according to claim 3, further comprising clear means for automatically clearing both the integrated lighting time from said time measuring means and the stored value from said storage means in response to a clear command from the external computer.

12. The laser lighting control device according to claim 2, further comprising notifying means for notifying an external computer of the integrated lighting-time of said laser light source measured by said time measuring means.

13. The laser lighting control device according to claim 12, wherein said notifying means notifies the external computer of the integrated lighting time of said laser light source measured by said time measuring means in response to a notification command from the external computer.

14. The laser lighting control device according to claim 13, further comprising clear means for automatically clearing the integrated lighting time from said time measuring means after said notifying means has notified the external computer of the integrated lighting time of said laser light source.

15. The laser lighting control device according to claim 13, further comprising clear means for automatically clearing the integrated lighting time from said time measuring means in response to a clear command from the external computer.

16. The laser lighting control device according to claim 12, further comprising clear means for automatically clearing the integrated lighting time from said time measuring means after said notifying means has notified the external computer of the integrated lighting time of said laser light source.

17. The laser lighting control device according to claim 12, further comprising clear means for automatically clearing the integrated lighting time from said time measuring means in response to a clear command from the external computer.

18. The laser lighting control device according to claim 1, further comprising:
a power source to power the laser lighting control device during a power on state and cutting off the laser lighting control device during a cut off state; and
storage means for storing, as a stored value, the integrated lighting time of said laser light source measured by said time measuring means immediately prior to the cut-off state and transmitting the stored value back to said time measuring means as the integrated lighting value when the power on state is initiated.

19. The laser lighting control device according to claim 18, further comprising notifying means for notifying an external computer of the integrated lighting time of said laser light source measured by said time measuring means.

20. The laser lighting control device according to claim 19, wherein said notifying means notifies the external computer of the integrated lighting time of said laser light source measured by said time measuring means in response to a notification command from the external computer.

21. The laser lighting control device according to claim 20, further comprising clear means for automatically clearing the integrated lighting time from said time measuring means after said notifying means has notified the external computer of the integrated lighting time of said laser light source.

22. The laser lighting control device according to claim 20, further comprising clear means for automatically clearing the integrated lighting time from said time measuring means in response to a clear command from the external computer.

23. The laser lighting control device according to claim 19, further comprising clear means for automatically clearing the integrated lighting time from said time measuring means after said notifying means has notified the external computer of the integrated lighting time of said laser light source.

24. The laser lighting control device according to claim 19, further comprising clear means for automatically clearing the integrated lighting time from said time measuring means in response to a clear command from the external computer.

25. The laser lighting control device according to claim 19, further comprising clear means for automatically clearing both the integrated lighting time from said time measuring means and the stored value from said storage means after said notifying means has notified the external computer of the integrated lighting time of said laser light source.

26. The laser lighting control device according to claim 18, further comprising clear means for automatically clearing both the integrated lighting time from said time measuring means and the stored value from said storage means in response to a clear command from the external computer.

27. The laser lighting control device according to claim 1, further comprising notifying means for notifying an external computer of the integrated lighting time of said laser light source measured by said time measuring means.

28. The laser lighting control device according to claim 27, wherein said notifying means notifies the external computer of the integrated lighting time of said laser light source measured by said time measuring means in response to a notification command from the external computer.

29. The laser lighting control device according to claim 28, further comprising clear means for automatically clearing the integrated lighting time from said time measuring means after said notifying means has notified the external computer of the integrated lighting time of said laser light source.

30. The laser lighting control device according to claim 28, further comprising clear means for automatically clearing the integrated lighting time from said time measuring means in response to a clear command from the external computer.

31. The laser lighting control device according to claim 27, further comprising clear means for automatically clearing the integrated lighting time from said time measuring means after said notifying means has notified the external computer of the integrated lighting time of said laser light source.

32. The laser lighting control device according to claim 27, further comprising clear means for automatically clearing the integrated lighting time from said time measuring means in response to a clear command from the external computer.

* * * * *

UNITED STATES PATENT AND TRADEMARK OFFICE
CERTIFICATE OF CORRECTION

PATENT NO.    : 5,602,861
DATED         : February 11, 1997
INVENTOR(S)   : Hiroaki KAWAI, et al.

It is certified that error appears in the above-indentified patent and that said Letters Patent is hereby corrected as shown below:

Cover page, Item [56], please insert the following U.S. references:

| 4,639,606 | 1/87  | Boles et al. |
| 5,179,269 | 1/93  | Horie et al. |
| 5,260,554 | 11/93 | Grodevant    |

Col. 2, line 61, after "out" insert --for--
       line 63, before "is" insert --it--

Col. 7, line 53, after "17" insert --to--

Signed and Sealed this

Twenty-fourth Day of June, 1997

Attest:

BRUCE LEHMAN

Attesting Officer    Commissioner of Patents and Trademarks